Nov. 16, 1954 W. JOHNSON 2,694,748

TELEVISION SIGNAL REPRODUCING SYSTEM

Filed Feb. 18, 1952 5 Sheets-Sheet 1

INVENTOR.
WAYNE JOHNSON
BY
Lippincott & Smith
ATTORNEYS

TELEVISION SIGNAL REPRODUCING SYSTEM

Filed Feb. 18, 1952 5 Sheets-Sheet 2

INVENTOR.
WAYNE JOHNSON
BY
Lippincott & Smith
ATTORNEYS

Nov. 16, 1954 W. JOHNSON 2,694,748

TELEVISION SIGNAL REPRODUCING SYSTEM

Filed Feb. 18, 1952 5 Sheets-Sheet 3

INVENTOR.
WAYNE JOHNSON
BY Lippincott & Smith
ATTORNEYS

Nov. 16, 1954 W. JOHNSON 2,694,748

TELEVISION SIGNAL REPRODUCING SYSTEM

Filed Feb. 18, 1952 5 Sheets-Sheet 4

INVENTOR.
WAYNE JOHNSON
BY
Lippincott & Smith
ATTORNEYS

INVENTOR.
WAYNE JOHNSON
BY
Lippincott + Smith
ATTORNEYS

④ United States Patent Office 2,694,748

Patented Nov. 16, 1954

1

2,694,748

TELEVISION SIGNAL REPRODUCING SYSTEM

Wayne Johnson, Los Angeles, Calif., assignor to John T. Mullin, Los Angeles, Calif.

Application February 18, 1952, Serial No. 272,084

15 Claims. (Cl. 178—5)

This invention relates to methods and apparatus for reproducing television or like signals from records of the type described in co-pending application of John T. Mullin, Serial No. 195,612, filed November 14, 1950, and entitled "System for Recording and Reproducing Television signals," or in the concurrently filed application of this inventor entitled "Television Recording and Reproducing System."

Records of television or like signals recorded in accordance with either of the applications referred to are in the form of a plurality of phonographic tracks, preferably, although not necessarily, of the magnetic-recording type. Each of the tracks is reproducible as a wave of substantially constant frequency, modulated by samples of the signal to be reproduced taken at a different phase of a timing wave of like frequency. As is implied by the use of the multiple tracks and the sampling technique, the frequency of the timing wave is much lower than the highest frequencies comprised in the signal to be thus recorded, and the method of reproduction consists, broadly, in sampling each of the reproduced wave trains at substantially their peak values to produce pulses, short in comparison to the period of the reproduced trains, and recombining these pulses, in the same order in which the samplings were taken in recording, to reconstruct the original wave.

As is well understood, the reason that television signals have not, until recently, been recorded and reproduced by phonographic methods, is that all phonographic equipment has an upper limit beyond which frequencies cannot be recorded and reproduced. What this limit may be depends upon the size of the scanning elements which can be used for recording and playback, whether they be mechanical, optical or magnetic, and upon the speed with which the recording medium may be progressed. Optical slits and magnetic gaps may be made much smaller than can mechanical scanning elements, but diffraction effects with optical slits and leakage from adjacent to the edges of magnetic gaps make it extremely difficult to make their effective dimensions less than 0.00025 inch or 0.25 mil. If the speed with which the record is progressed is such that the record moves a distance equal to the dimension of the scanning element in exactly one whole cycle of the signal, no signal is recorded and the efficiency of the system falls very rapidly if the record moves a distance less than the translating or scanning element's dimension in one-half cycle of the signal; i. e., if the record wave-length on the recording medium is less than twice the dimension of the translating element in the direction of the motion.

There is, of course, no theoretical limit on the record speed, but if a signal of any material length is to be recorded the use of very high record speeds means that the bulk of the record becomes very large. For this reason alone practical recording of very high frequencies, such as are involved in television and like programs, is practically limited to records which may be made of very light material, such as photographic film or magnetic tape. Because of its low cost, light weight, and availability, magnetic recording on plastic tape coated with magnetizable oxides is to be preferred. Further discussion of the invention herein will therefore be directed specifically to recordings of this character, but it is to be understood that the principles involved may be applied to any type of phonographic recording and that the use of magnetic methods is for convenience and economy and not because of any theoretical limitation; even if some wholly new method of phonographic recording on a moving medium were to be devised the same methods as herein discussed could be employed, provided only that the recording be reproducible as electric waves.

2

Practical experience indicates that using a magnetic record, a tape speed in the neighborhood of 100 inches per second is feasible with present types of drive and methods of tape handling. Using the criterion mentioned for the upper frequency limit this would mean that with a magnetic gap 0.25 mil in length 200 kilocycles can be effectively and accurately recorded and reproduced before the efficiencies begin to fall off unduly.

Under present standards of television transmission the modulating or signal component of the video signals occupies a band four megacycles in width; the highest frequency to which the system will respond therefore being twenty times that which can be directly recorded with the translating heads and at the record speed mentioned. To overcome this limitation there is disclosed in the Mullin application above cited a system of frequency division which comprises, essentially, modulating a number of phase-displaced waves, of a frequency which can be recorded, with samples of the signal to be reproduced taken at intervals corresponding to the half-period of the highest components of the signal frequency spectrum. Thus, for example, a sample of the television signal not over one-eighth microsecond long, is taken at time zero and used to modulate a lower frequency wave. A second sample is taken one-eighth of a microsecond later and is modulated upon a second wave, of the same frequency as the one first modulated but displaced in phase by one-eighth microsecond. So, repetitively, successive samples are modulated upon separate phase-displaced waves until, at the next cycle the wave first mentioned, the procedure comes around full circle. In playback or reproduction a reverse operation takes place, the various recorded relatively low frequency waves being in turn sampled at their peak values to produce pulses corresponding in magnitude to the original samples taken in recording, these pulses being recombined, in proper order, to reconstruct the original signal.

In the co-pending application of this inventor, filed concurrently herewith, there is disclosed a modification of the Mullin system wherein the samplings are imposed upon both positive and negative halves of the relatively low frequency wave, thereby doubling the amount of information that can be contained in a single track and cutting the necessary number of tracks and translating heads in half. In the particular equipment specifically described in the concurrently filed application above referred to, the frequency of the phase-displaced waves upon which the various samplings are modulated is taken as 165.135 kilocycles. For convenience of reference this will hereinafter be referred to as the "165 kc. wave," the fraction being disregarded. Each cycle of such a wave occupies 0.6 mil along each record track and the half cycle which carries each sampling occupies half this distance or 0.3 mil. Owing to the frequency limitations in the recording equipment it becomes difficult to record square wave forms in such small dimension. The tendency, due to the limitations of the equipment itself, is to produce recordings which are reproduced as sinusoidal in general form, each successive sampling being played back as a half of a sine wave. In the illustrative case referred to, twelve recording heads are used and hence the waves on the different tracks differ in phase, as recorded, by fifteen electrical degrees. This represents a distance along the record track of only 25 millionths of an inch. In playback, if the original signal is to be reconstructed with complete accuracy, each of the reproduced modulated waves must be sampled exactly at its peak. If it be considered that any signal within 10% of the peak value is accurate enough, the sampling of the reproduced modulated waves must be within 25° of the peak but this represents a distance along the track of only forty-one millionths of an inch or 0.041 mil.

If the recording and reproduction were always both to be accomplished upon the same machine and the same heads used for pick-up and play-back this would present no particular problem. The relative phasings of the waves that are to be modulated by the samples and the sampling itself can be quite easily accomplished by the methods set forth in the concurrently filed application. With respect to any single track the phasing remains so nearly constant that such deviations as do occur may be neglected. In playback, however, the phase of the reproduced waves depends upon the position of the heads, measured along the tracks. Were it possible to aline heads perfectly, transversely of the tracks, the electrical portion of the operation would still present no problem. Practically, however, there is a limit to the precision with which the various heads can be assembled and with the short record wave-lengths here proposed the necessary precision would be in excess of what can actually be achieved. Although the effort be made to aline the heads as accurately as possible, deviations in position due to mechanical inaccuracies may occur on either side of the desired norm and it is always possible that the recording head may deviate on one side of the norm while the pickup head is misalined in the opposite direction. The required tolerance, if the signal is picked up directly, is therefore within twenty millionths of an inch or 0.02 mil and this is a greater accuracy than can practically be achieved. A tolerance of plus or minus 0.1 mil is about the best that can be accomplished practically, and even this is vastly more expensive than to produce equipment within a tolerance of 0.2 or 0.25 mil.

Stated broadly, the system of reproduction which is the subject of this application involves developing, from successive half cycles of each of the reproduced waves, separate electric charges which may be stored for any period up to nearly one full cycle of the 165 kc. wave or to nearly two, three or more cycles, depending upon the amount and nature of the equipment used, and sampling the stored charges in their proper order instead of the wave itself. From the standpoint of apparatus this means providing, for each of the phonographic tracks, a plurality of storage or memory condensers, usually in multiples of two. Means are provided for charging these condensers, successively, to potentials proportional to the crest value of successive modulated half cycles of the reproduced wave, each charge, therefore, corresponding to one sampling of the original signal. Hence, for example, if two storage condensers only are provided for each track, each may be permitted to charge for a fraction of the timing wave period, say one-sixth, or sixty electrical degrees, and each charge may be held for the remaining five-sixths of the cycle. In terms of time this would mean that one microsecond would be allotted to charging and the charge could be held for any necessary period thereafter of from zero to five microseconds; in terms of distance along the record, charging would occur while the record progressed 0.10 mil while the discharge could take place anywhere within the remaining five-tenths mil of the record wavelength. If four storage condensers are used, the charge can still be limited to sixty or, better, ninety electrical degrees, while the discharge can be accomplished anytime during the remaining 270° of the cycle represented by the charge, plus the succeeding cycle; again in terms of record motion, over a distance of 1.1 mils instead of the 0.08 mil (±0.04) which would be required for direct sampling. Discharge takes place in the proper order, the only difference being that the condenser charges are used in succession to modulate the outgoing pulses instead of the played back waves directly.

As should be apparent from the foregoing the specific purpose of the invention covered by this application is to increase the tolerance permissible in the phases of the reproduced waves by large factor; a minimum of sixfold or, with increased equipment, by increments of substantially one record wave length to fifteen-fold or more. The objects thus to be attained include the provision of a method of reproducing television signals with a minimum number of translating heads and feasible record speeds; to provide a system wherein the records to be reproduced and played back are of such size and bulk as to be readily handled and transported; to provide a system wherein equipment for the driving, processing, and, in general, the manipulation of the record are of known character and feasibility; and (which is another aspect of the increase in tolerance above mentioned) to provide a system wherein the mechanical workmanship required, while of instrument maker's quality, does not have to approach the limit of mechanical perfection, with the result that the apparatus may be constructed at a reasonable price and maintained by engineers and technicians of ordinary rather than extraordinary skill.

Turning now to the drawings.

The specific apparatus herein described is intended for the decoding and reproduction of signals such as result from recording equipment set forth specifically in the concurrently filed application heretofore mentioned. The recordings as there described comprise a plurality of tracks recorded in parallel on a magnetic tape, which may be one inch wide or less. In a practical system these tracks include a separate track for the sound which normally accompanies a television picture, plus those specifically intended for the picture recording and reproduction. One of the tracks is a recording of an unmodulated timing wave of the 165 kc. frequency, from which are derived a plurality of pulse trains, displaced in phase and either of the timing wave frequencies or a sub-multiple thereof, which are used for sampling or discharging the charges collected from the several signal tracks. The tracks may vary in number in accordance with the detail required from the resulting television signal; it has been shown in the concurrently filed application that with the frequencies and record speeds here postulated twelve tracks are sufficient to develop a signal carrying substantially the full, four-megacycle band of information required by present standards and that ten tracks will give sufficiently wide frequency band to meet many requirements. The signals recorded on each track are in the form of the 165 kc. timing frequency, each half cycle of each track being modulated by a separate sample taken from the original television signal, and the phases of the signals recorded are displaced by electrical angles equal to $$\frac{n-1}{n} \text{ times } 180°$$

where $n$ is the number of translating heads. It is to be understood that all the specific numbers here given, including the frequency of the timing wave, the speed of the tape and the number of heads, are illustrative only, since if a signal carrying more or less information is desired any or all of these illustrative figures may be changed.

Figure 1:
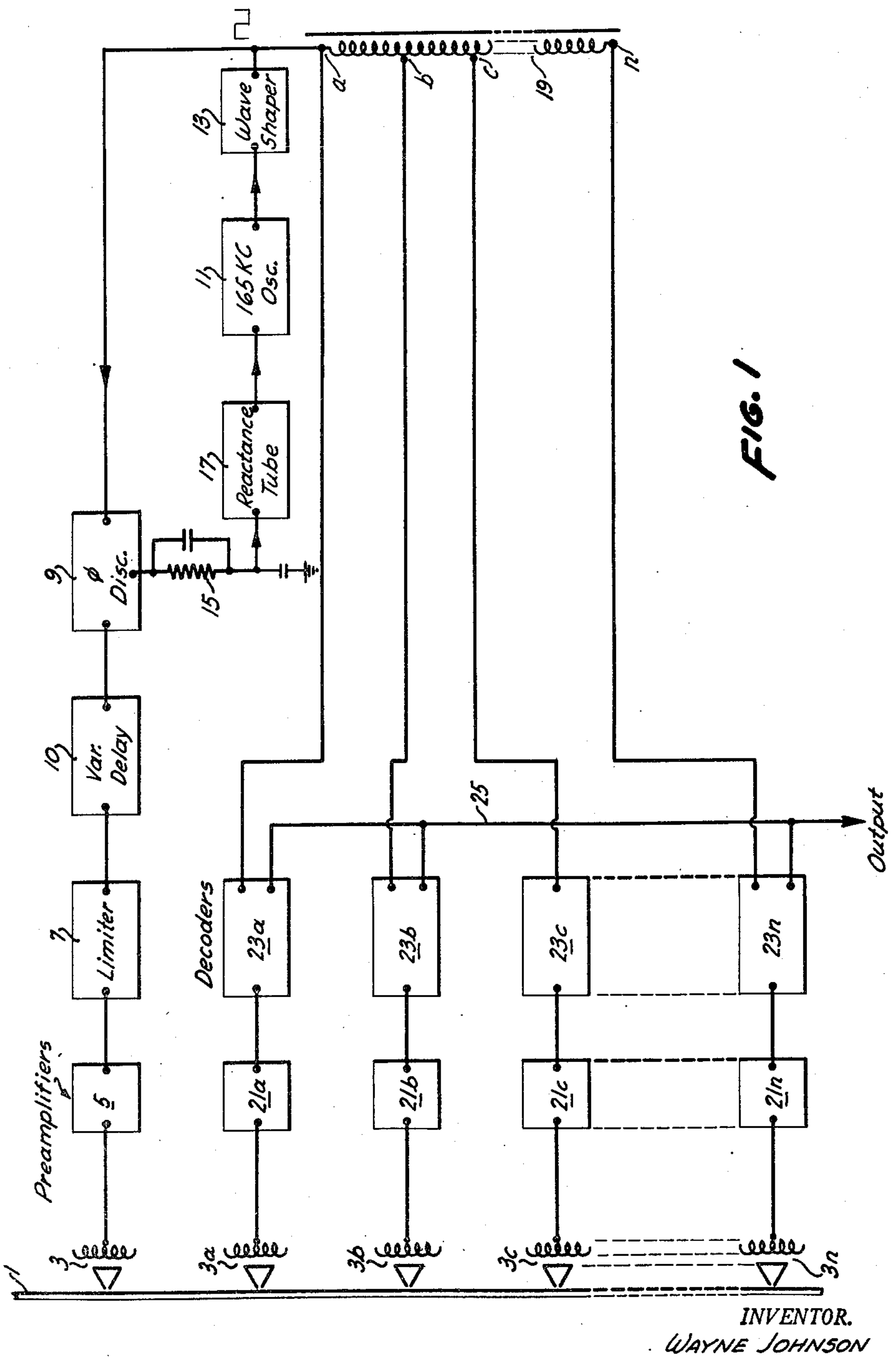
Fig. 1 is a block diagram of a reproducing system in accordance with the present invention, which results in a sampling time of approximately five-sixths of a cycle of the modulated frequency, illustratively herein referred to as the "165 kc. wave"

The reproducing equipment illustrated in the block diagram of Fig. 1 is limited to that directly involved in the present invention; for auxiliary equipment useful or necessary in a complete reproducing which would supply accompanying sound, restoration of synchronizing signals and dot-interlace, reference is made to the concurrently filed application hereinbefore cited.

In Fig. 1 the tape is indicated at the reference character 1. A plurality of substantially identical translating heads 3, 3$a$, 3$b$, . . . 3$n$ is ranged transversely to the direction of motion of the recording medium, which is progressed at a uniform speed by conventional tape driving mechanism not shown.

Recording head 3 is positioned to engage with the unmodulated 165 kc. timing wave track, and signals representative of this wave are supplied to a preamplifier 5, which passes it on to a limiter 7, after which it is fed to a phase discriminator 9. A variable-delay network 10 is shown as inserted between the limiter and the phase discriminator, but it may be positioned in any portion of the circuit where it will control the phase of the sampling waves.

The phase discriminator is also supplied with a wave of the same nominal frequency from an oscillator 11. The output of this oscillator is first passed through a wave-shaper 13 which converts the substantially sine wave signals fed to it to waves of rectangular wave form before sending them on to the phase discriminator. Any difference in phase between the waves so fed to discriminator 9 results in a D.-C. error signal, the polarity and magnitude of which depend upon the direction and magnitude, respectively, of any discrepancy in phase between the signals fed to it. The error signal is passed through a filter 15, which removes the alternating components of the error signal, and thence to a reactance tube 17, which, bridged across the tank circuit of the oscillator 11, controls the frequency of the latter and maintains it at the same average frequency as the track. The use of a separate oscillator 11 is not a necessary feature of the invention. The timing wave may, if desired, be fed to the wave shaper 13 directly and used for the same purpose as the oscillator output. The separate oscillator, however, serves to remove the effect of any residual high-frequency flutter, which may develop in certain types of tape drive mechanism, and hence stabilizes the output of the reproducing system, but with types of drive which do not produce such flutter this portion of the equipment may be omitted.

Square pulses from the wave shaper 13 are also fed to a delay line 19. The line 19 has a total delay of approximately three microseconds, or one-half cycle of the 165 kc. wave, and is tapped at points *a, b, c, . . . n,* along its length. The tap *a* is at the input of the line; the tap *n* at the extreme end. The taps are equally spaced to give equal increments of delay between taps such that the total delay is equal to $$\frac{n-1}{2n}\times p$$

where *p* is the period of the 165 kc. wave.

Translating heads 3*a*, 3*b*, etc., are positioned to engage the various phase-displaced tracks on the record. The outputs of the respective heads are supplied to preamplifiers 21*a* to 21*n* respectively and thence fed, in amplified form, to decoders 23*a* to 23*n*. Taps *a* to *n* on the delay line connect to the decoders carrying the corresponding postscripts, to supply to the decoders waves in proper phase to control the decoding.

Decoders 23*a* to 23*n* are identical in any one equipment, although they may assume a number of different forms. Several such forms will be described herein but it should be understood that although these forms are shown in connection with different intervals during which the signals can be stored, actually they are practically interchangeable, requiring only slight modification for adaptation to a specific embodiment. Other forms of decoders using similar principles have been devised and could be substituted for those shown, but it is believed that the selections illustrated are sufficient to give at least an indication of the wide variety of instrumentalities through which the invention may be applied.

Figure 2:
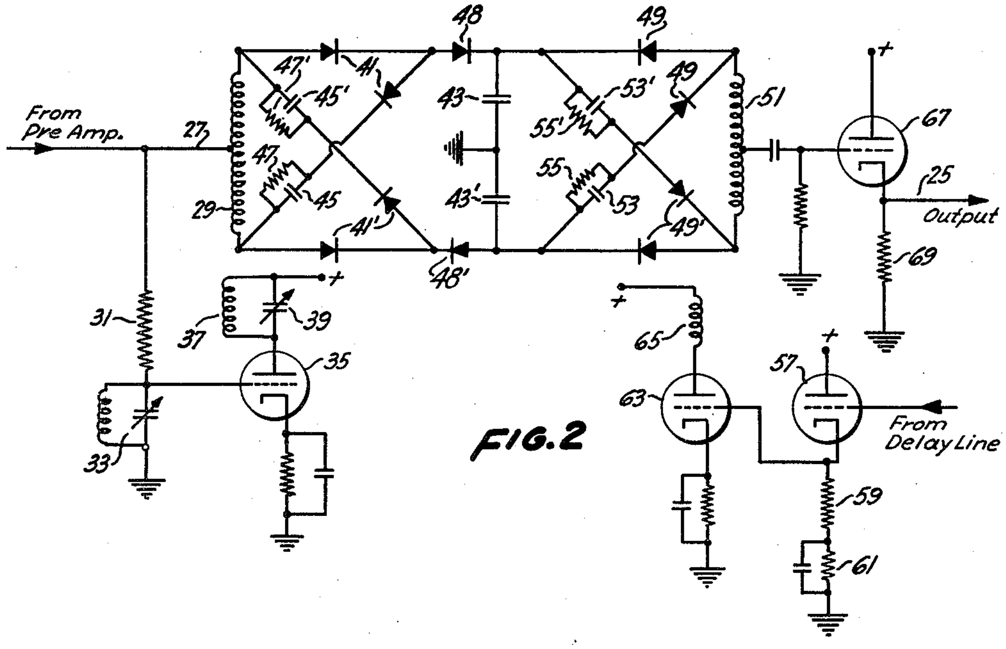
Fig.2 is a schematic diagram of one form of decoder as utilized in connection with each signal track and symbolized by the blocks labeled "Decoder" of Fig. 1.

Considering first the form of decoder shown in Fig. 2, the signal from the preamplifier is divided into two paths. The first of these paths comprises lead 27 connecting to the center tap of a secondary coil 29. This branch carries the actual reproduced signals. The second branch comprises a decoupling resistor 31 which in turn connects to one side of a medium high Q resonant circuit 33, tuned to the 65+ kc. frequency of the reproduced wave. Owing to the high Q of the circuit it will ring continuously with little change in amplitude, irrespective of the modulation in the recorded waves. A connection from the junction between the decoupling resistor 31 and resonant circuit 33 leads to the grid of a conventional triode amplifier 35. The anode of the amplifier tube connects to a primary coil 37, tuned by a condenser 39, to the same frequency as resonant circuit 33. Primary 37 is coupled to coil 29, to form what corresponds to the carrier input circuit of a special purpose modulator.

The two ends of coil 29 connect, through oppositely poled rectifiers 41, to one terminal of a storage or memory condenser 43, the other end of which is grounded. Both ends of coil 29 also connect through a like pair of oppositely poled rectifiers 41′ with a similar condenser 43′. These are the two condensers upon which charges corresponding to the peak values of the reproduced waves are stored. It will be seen that the circuit as thus described is very similar to that of a conventional ring modulator, with the condensers 43 and 43′ taking the place of the customary output coil of such a modulator. In addition, however, to the circuit elements mentioned, each of the diagonal connections of the modulator circuit has inserted therein a condenser, 45 and 45′ respectively, bridged by a resistor 47, 47′. The capacity of each of these condensers is large in comparison with that of the storage condensers, and the resistors bridging them are of such value as to make the time-constant of the combination long in comparison with the approximately six microsecond period of the recorded wave. There may also be included, in the connections between condensers 43 and 43′ and the oppositely poled rectifiers 41 and 41′ respectively, additional rectifiers 48 and 48′, to prevent the discharge of the storage condensers. If the amplitude of the 165 kc. wave, and hence the bias potential, is sufficiently high in comparison with the signal voltage rectifiers 48 and 48′ may be omitted.

The oscillations induced in coil 29 from coil 37 are large in amplitude in comparison with the signal potentials to be stored. Owing to the rectifying action of the diodes each of these condensers will charge to very nearly the peak value of these oscillations, applying a bias to the diodes which prevents their conducting except at the peaks. Circuits 133 and 139 are so tuned that the peaks of these oscillations occur slightly before the peaks of the modulated waves fed to the circuit through lead 27. Accordingly it is only during the brief epochs of the cycle, when the constant amplitude oscillations are at their peak value, and hence effectively neutralize the bias charge accumulated upon condensers 45, 45′, that the diodes can conduct and the current from lead 27, dividing through the two halves of primary 29, can flow through the diodes to charge condensers 43 and 43′, depending upon the polarity of the constant amplitude oscillation.

The length of the interval during which the diodes conduct can be regulated by the magnitude of bridging resistors 47, 47′. Preferably these elements have a high resistance; the higher it is the shorter will be the period of conductivity. A desirable adjustment is one wherein the bias maintained upon the condensers 45, 45′ is equal to the peak value of the constant amplitude modulation minus the maximum potential to be expected from the signals fed directly from the preamplifier. The higher the constant amplitude oscillations in comparison to that of the signal waves the shorter the period of conductivity can be made. In the embodiment of Fig. 2 it is desired that this period be not greater than sixty electrical degrees, or 30° on each side of the actual peak of the control oscillation, and that conduction shall cease at the peak of the signal wave. The latter should therefore lag in phase by 30°.

The 60° charging interval is one-sixth of the timing wave period. The condensers 43 and 43′ will store their charges until sampled or until the next charging interval, and since, as will next be shown, they may be sampled and discharged at any time except during the instants when they are charging, this leaves five microseconds out of the six-microsecond period when the final sampling may occur.

The circuit through which the final sampling is accomplished may be substantially a mirror image of the storing circuit just described, condensers 43 and 43′ acting, in this instance, as the input instead of the output of a ring modulator. Rectifiers 49 in the branches of the circuit connected from the ungrounded side of condenser 43 connect to opposite terminals of a center tapped coil 51, and rectifiers 49′ are similarly connected from condenser 43′. Biasing condensers 53 and 53′ are shown as connected in the diagonal arms of the modulator ring and are bridged, respectively, by resistors 55 and 55′.

The square sampling pulses from the delay line 19 are applied to the grid of a triode 57, connected as a cathode follower and limiter, the cathode connecting to ground through resistors 59 and 61. The potential to ground across resistors 59 and 61 is applied to the grid of a second triode (or the second section of a dual triode) 63. A low inductance output coil 65 couples to coil 51, forming, with the latter, a differentiating transformer, which converts the square waves into alternate positive and negative pulses of approximately 0.1 microsecond's duration. The amplitude of these pulses is made large in comparison with the potentials stored on condensers 43 and 43'.

Resistors 55 and 55', however, are preferably made of lower value than corresponding resistors 47, 47', so as to maintain a lower bias on the diode circuit. On this output or sampling side of the circuit the bias need be maintained only of sufficient value to equal the maximum charge on the storage condensers and thus prevent its leaking off through what would otherwise be the conducting diodes connected to them. This relatively low value of bias permits the complete discharge of condensers during the very short sampling pulses.

The center tap on coil 51 connects to the grid of a cathode follower tube 67, the output of which connects the common television signal circuit 25. Cathode resistor 69 of the tube 67 may be common to all of the decoder circuits, thus serving to combine the pulses from the several tracks.

Figure 5:
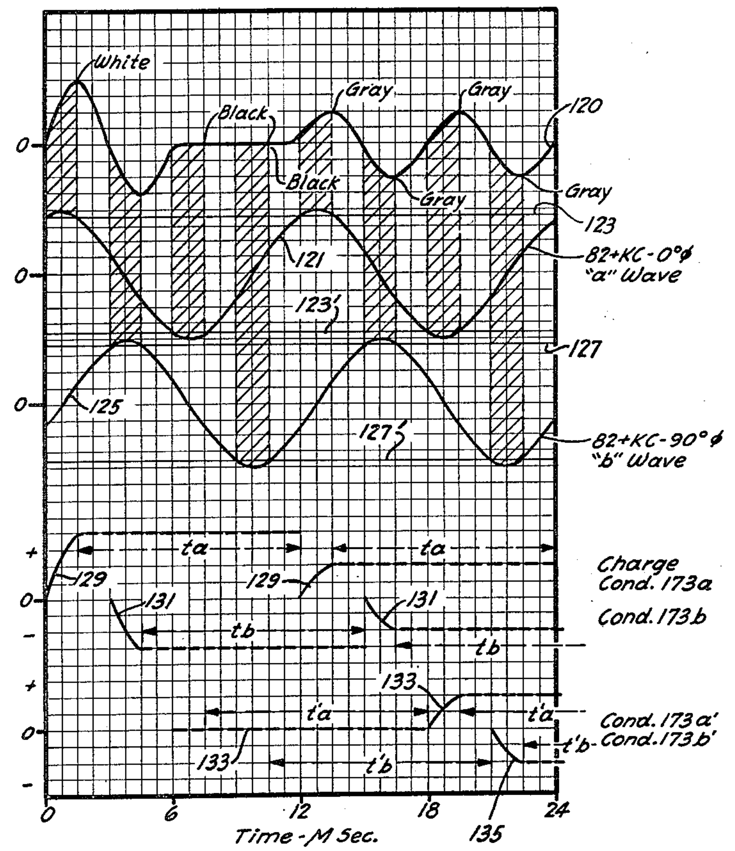
Fig. 5 is a diagram illustrating the relationship of the various waves as produced and stored by the equipment of Figs. 3 and 4.

It has been found, by the use of microscopes in assembling them, that the translating heads, when limited in number to ten or twelve, may be alined to an accuracy of plus or minus 0.1 mil from a norm, but that a tolerance of ±0.2 mil is more practical. At the tape speed here postulated the record-wave-length is very closely 0.6 mil, and inaccuracies in reproduction, assuming that playback is accomplished with a different set of heads than those used in recording, is plus or minus 0.2 mil or a maximum deviation from the norm of 120 electrical degrees. In time this amounts to two microseconds on either side of the norm or eight cycles of the maximum frequency in the reconstructed television signal. With the memory provided by the condensers 43, 43', the charges stored on these condensers can be converted into pulses at any portion of the cycle of the reproduced waves except that during which the condensers are being charged. As has already been stated, the charging period can be made less than 60°, or 30° on either side of the peak value of the wave applied to coil 37. This leaves periods of five microseconds during which the final modulation of the sampling pulse train from the delay line can be accomplished or 0.5 mil of track length on the recording medium. Since, with the accuracy of construction which has been postulated, the maximum deviation to be expected from one side to the other of the norm is 0.4 mil or four microseconds, the latitude provided by the decoder of Fig. 5 is sufficient to provide a high quality reproduced signal, without overlapping or confusion of the mixed pulses from the various decoders.

The degree of mechanical precision requisite for this purpose is very high and the costs of producing mechanical equipment rise rapidly as the precision requirements are increased. In producing the equipment described commercially it may therefore be found advisable to increase the latitude permitted by the equipment as thus far described.

Several expedients for this purpose are possible, each with corresponding advantages or disadvantages. One obvious method is the increase of tape speed, but this increases the bulk of the records produced and the stresses that are imposed upon the tape, with increased liability of breakage. Another method is an increase in the number of recording heads and a corresponding decrease in the timing frequency. This method is quite sharply limited because the difficulty of precise alinement increases with the number of heads and as much may be lost as is gained. A third method is electronic. With this third method the tolerance permissible in the mechanical apparatus is approximately doubled and can be increased even further; very nearly two full cycles of the timing wave is available for the final sampling, giving a total latitude of from ten to eleven microseconds or from 1 to 1.1 mils along the record track in the form next to be described and additional time for sampling can be provided in increments of the timing wave period. This additional tolerance is gained at the expense of additional electrical equipment but the expense involved may be justified in view of decreased costs of mechanical construction and maintenance.

Figure 3:
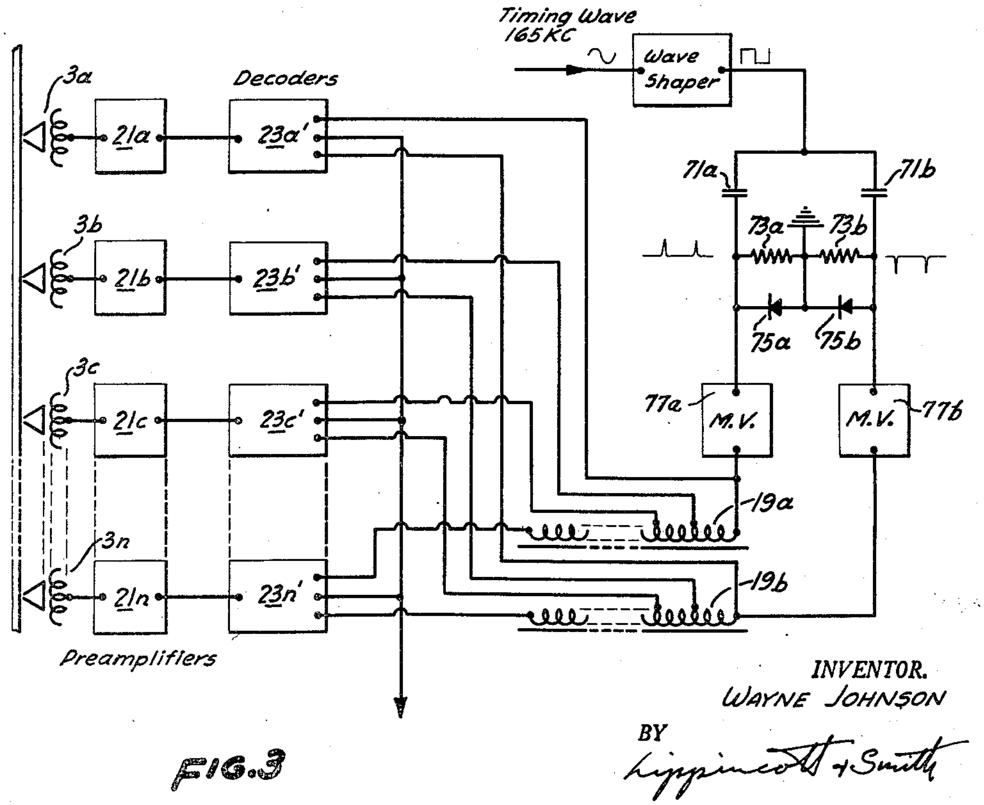
Fig. 3 is a block diagram of the equipment as used to provide a possible sampling period of nearly two cycles of the timing wave.
Figure 4:
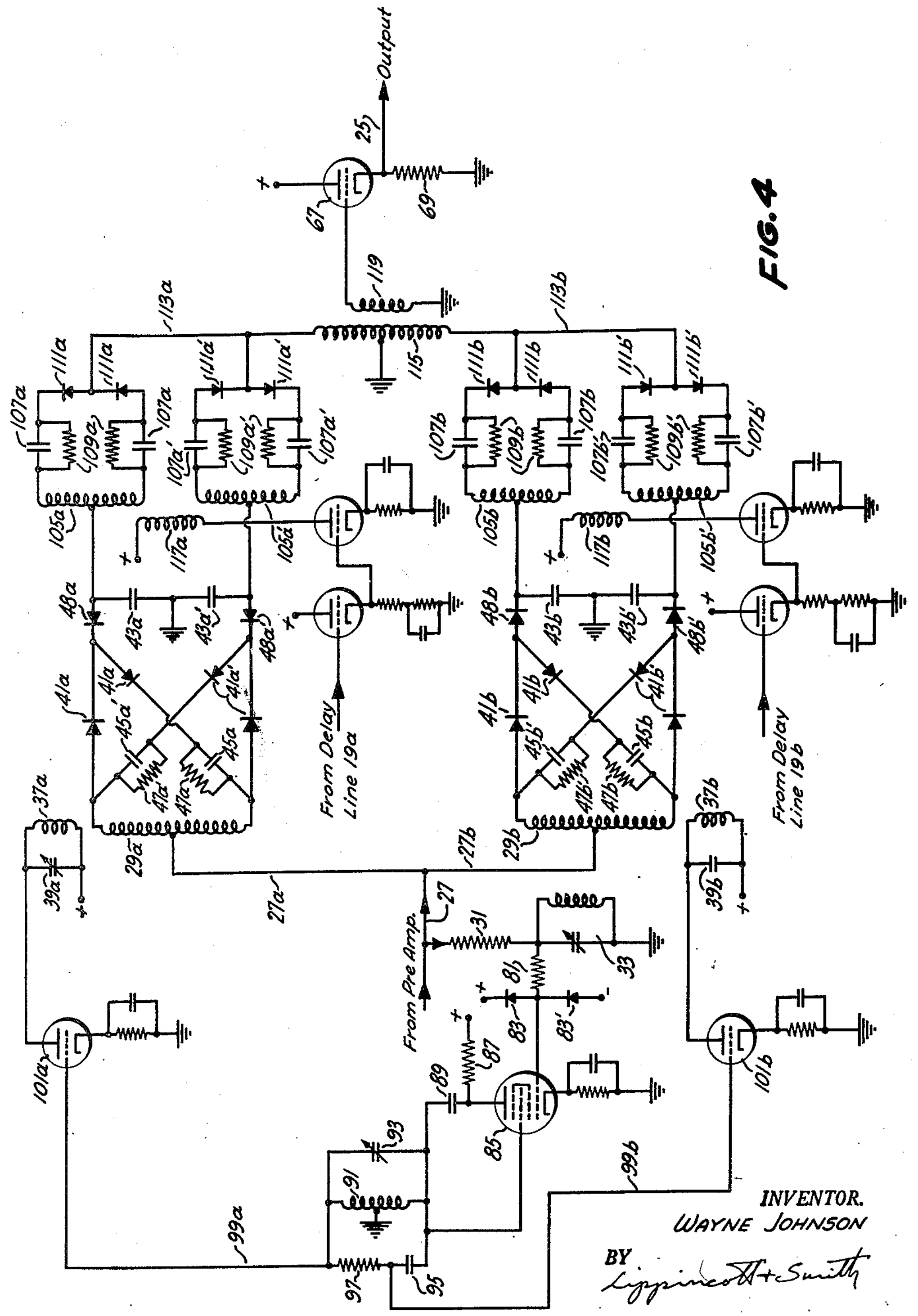
Fig. 4 is a schematic diagram of a form of decoder applicable in the circuit of Fig. 2.

A block diagram illustrating the equipment involved is given in Fig. 3 and the details of the decoder used therewith are shown schematically in Fig. 4. In each of these figures those portions of the equipment which are identical with the parts already described in connection with Figs. 3 and 5 are omitted and only the equipment which differs from that already described is shown.

The apparatus shown in Fig. 3 is supplied with timing signals from wave shaper 13 of Fig. 1 and with video signals from the pick-up heads **3*a* to 3*n***, these elements being illustrated in the figure and being identical with those shown in Fig. 1.

Square waves from wave shaper 13 are fed to two parallel differentiating circuits comprising, respectively, condensers 71 and **71*b*, connecting through resistors 73*a* and 73*b* to ground. Each of these resistors is shunted by a diode 75*a*, 75*b*, the diodes being oppositely poled with respect to the grounded side of the circuit. The differentiating circuits produce, from the square waves supplied to them, pulses of alternating polarity, occurring simultaneously and in phase. Diode 75*a* shorts out and suppresses the negative pulses, diode 75*b* similarly suppresses the positive pulses. The two resulting unidirectional pulse trains are supplied, respectively, to two bistable multivibrators or flip-flop counters, 77*a*, 77*b***, adapted respectively to respond to pulses of opposite polarity. Each of these counters develops a wave train of one-half of the repetition frequency of the input pulses, or 82,137.5 cycles. Since the two output waves differ in timing by one-half cycle of their input frequency they are 90° out of phase with respect to the half frequency of 82+ kc., hereinafter referred to as the "82 kc. wave."

The wave trains thus developed are fed to separate delay lines **19*a* and 19*b* and supply dual decoders corresponding in function, to decoders 23*a* to 23*n* and distinguished, in the diagram, by reference characters 23*a'* to 23*n'*. These decoders are connected to receive their signal information from pickup heads 3*a* to 3*n* through preamplifiers 21*a* to 21*n*** as has above been described.

One of the dual decoders is illustrated in Fig. 4. The signals from pickup head **3*a* and preamplifier 21*a* are divided, as before, between a signal lead 27 and a timing circuit comprising decoupling resistor 31 and a high Q resonant circuit 33. The signal circuit 27 is in this case, however, again divided into two branches 27*a* and 27*b*. Each branch serves to charge condensers corresponding to condensers 43*a* and 43*b*** of Fig. 2, and as these circuits, up to and including the condensers mentioned, are identical with those described in connection with the latter figure, they are identified with similar reference characters followed by the postscripts *a* and *b*, respectively distinguishing the two branches.

Instead of the condenser charging being controlled by the 165+ kc. timing frequency, however, they are controlled by the half-frequency of 82+ kc. This latter frequency is developed from the record on the specific track with which the equipment is associated by potentials derived from the high Q circuit 163. The frequency division for this purpose may be accomplished by various known means. In the arrangement here shown, the ungrounded side of the resonant circuit connects through a limiter, comprising a series resistor 81 shunted to ground by oppositely poled diodes 83, 83', to one grid of a hexode 85. The anode of the tube 85 is supplied from a suitable source through a resistor 87. A blocking condenser 89 connects the anode with a resonant circuit comprising a coil 91 bridged by a condenser 93. The center of coil 91 is grounded. The circuit as a whole is tuned to the 82+ kc. frequency. A second grid of the hexode 85 connects to one side of the tuned circuit. The oscillations developed in the latter alternately buck and boost the impulses from the first grid, to generate the desired half frequency. The oscillation circuit is bridged by a phase splitter, comprising a condenser 95 in series with a resistor 97. One side of the phase splitter connects through a lead **99*a* to an amplifier 101*a*; a lead 99*b* connects the condenser-resistor junction to the grid of an amplifier 101*b***. Except that they are 90° out of phase with each other these amplifiers are identical.

Tube **101*a* supplies the timing oscillations to a resonant circuit comprising a coil 37*a* in parallel with a condenser 39*a*, the coil 37*a* being coupled to coil 29*a*. The only difference the performance of the storage circuit with that already described in connection with Fig. 2 is the length of the storage period. In order to store the maximum amount of energy in the storage condenser the charging period should terminate at the voltage peak of the signal waves and the charging should start when the signal waves are passing through zero. This corresponds to a 45° charging angle of the 82+ kc. wave, or 22½° on either side of the voltage maximum, and the biasing resistors 47_a_ and 47_a'_ should be adjusted accordingly. The phase of the control wave can be controlled by tuning condenser 39**_a_.

The output circuits for the storage condensers as shown in this embodiment are quite different from those shown with the decoding equipment of Fig. 2 but accomplish the same purpose. The ungrounded side of condenser 43_a_ connects to the center tap of a coil 105_a_, to each end of which is connected a biasing circuit comprising condensers 107_a_ bridged by resistors 109_a_, the other end of both of these biasing circuits connecting to two diodes 111_a_ in series, these diodes being poled in the same direction considered around the loop thus formed. The junction between the diodes connects to a common circuit 113_a_, leading to one side of a primary coil 115, the midpoint of which is grounded. Condenser 43_a'_ connects through an exactly similar circuit to the same common lead. The "_b_" side of the dual decoder, i. e., the half supplied from lead 27_b_, is identical with the "_a_" side in construction, the only difference being that its charge and operation is under the control of a wave 90° out of phase.

Coils 105_a_ and 105_a'_ are equally coupled to a coil 117_a_ which is supplied with square pulses from the delay line 19_a_ in the same manner as is coil 65 as in Fig. 2. The square pulses are differentiated in coils 117_a_ and 105_a_ and 105_a'_ to give the 0.1 microsecond pulses desired.

The modulated output pulses are transferred through a secondary coil 119, coupled with the common primary coil 115, to the grid of the cathode follower tube 67 which performs exactly the same function as the like numbered tube of Fig. 2.

The phase relations of the various operations that take place in this last described form of the decoder are illustrated in Fig. 4. The upper curve, designated as 120, is intended to represent a portion of a reproduced signal as delivered from preamplifier 21. This curve represents eight samplings of the original television image, occurring within an interval of twenty-four microseconds. The samplings are assumed to have been, successively, white, light grey, black, black, followed by four equal, darker grey samples. As has been described each sample is represented by a half cycle of substantially sinusoidal form, with the exception of the black samples, which are of zero level. Actually the only signals at zero level would be the "blacker-than-black" synchronizing signals, but since such signals do occur interspersed with picture information they are illustrated to give a more diverse showing of what may happen.

Next below curve 120 is curve 121, representing the zero-phase or "_a_" charge-control signal. The phase of this signal is so adjusted that the peak of the curve leads the corresponding peaks of curve 120 by 22½ electrical degrees of the 121 wave. Lines 123 and 123' designate the bias levels on condensers 45 and 45_a'_ respectively, which are adjusted so that curve 121 exceeds these levels only for a 45° interval on either side of the peak of the 121 wave. Curve 123, in like manner, represents the "_b_" control wave, with lines 127 and 127' representing the bias values. The dotted lines, bordering shaded area connecting curve 120 wtih curves 121 and 123, indicate the conducting periods of the condenser charging modulators.

Below the curves just described are a group of partial wave forms illustrative of the charges accumulated by the various storage condensers. In each of these curves the rise from zero is represented by a solid line, which carries to the positive or negative peak and then merges with a dotted line. The instant of potential rise for each condenser is determined by one of the waves 121 or 125, but, so far as a particular channel is concerned, the instant of fall back to zero level is indeterminate. Thus wave-forms 129 represent two successive charges on condenser 43_a_, corresponding to the first and fifth samples on wave 120. A rise occurs in the first one and one-half microseconds of the wave shown. During this 1.5 microsecond interval condenser 43_a_ is charged to the peak value of the first half-cycle of the reproduced wave. It may be discharged any time during the ensuing 10.5 microseconds, indicated by the time interval _ta_ in the curves. Wave forms 131 indicate, in like manner, successive charges on condenser 43_b_, as controlled by wave 125. Wave forms 133 represent charges on condensers 43_a'_ and wave forms 135 charges on condensers 43_b'_. In both of the latter two curves the first cycle of the wave is zero, since the sampling occurred during a black interval. Wave 121 samples only successive positive half cycles of the reproduced wave, whereas wave 123 samples only successive negative half cycles. The positive half cycles place positive charges on the condensers, irrespective of whether the charging switches are operated by a positive or negative half cycle of the control wave whereas the negative half cycles result in negative charges upon the corresponding condensers.

The discharge cycles of condensers 43_a_, _a'_, _b_, and _b'_ are not shown, but it will be seen from following out the discharge circuits that the zero-phase delay line pulses always discharge a positively charged condenser, while the 90°-phase delay line pulses discharge negatively charged condensers. Since positively and negatively charged condensers discharge in opposite directions through the primary coil 115 of the output transformer, the result is the desired unidirectional signal as fed to the common output lead 25.

The use of the dual decoders of Fig. 4 leads to much greater tolerance in mechanical construction, as has been above indicated. With a simple form of decoder, as shown in Fig. 1 of the concurrently filed application, where the production of an approximately square wave form on the recording medium is relied upon to produce the necessary latitude in the scanning interval, about the best that can be hoped for in the production of a flat topped wave is one which gives a period of approximately one-quarter cycle of the recorded wave, or 1.5 microseconds, in which a satisfactory sample can be taken. In the simpler storage type decoder shown in Fig. 2 of this application the sampling time is not so definitely fixed; a compromise must be made as between condenser charging time, so as to store maximum energy, and the interval remaining for sampling. The compromise now preferred uses a 60° charging interval and 300° discharge interval; i. e., a one microsecond charging time and a five microsecond sampling time, giving a three-and-one-third fold gain in the possible sampling interval. The equipment of Fig. 4 permits the use of the optimum charging time of 90 electrical degrees and again more than doubles the possible sampling interval, giving total gain over the simplest form of seven fold, or an interval of 10.5 microseconds during which the discharge may take place, as contrasted with the one and one-half microseconds where the storage or memory is not used. This increases the permissible tolerances in the mechanical construction by nearly an order of magnitude.

It will be seen that additional latitude in sampling time can be gained, if desired, by still further sub-dividing the decoder. With what has here been disclosed it will readily be apparent to those killed in the art that, by using a charge-control frequency of one-third or one-fourth of the original timing wave, the sampling interval can be extended to sixteen and one-half or twenty-two and one-half microseconds respectively. In any case the principle involved would be the same; the charge is stored under the control of a wave whose phase is determined solely by that at which the particular track being sampled is recorded, irrespective of the phase of that wave with relation to the primary timing wave. The sampling itself, however, is strictly under the control of the timing wave irrespective of possible relative phase shift with respect to the individual track.

The timing wave head is preferably taken as the norm or standard with which the other heads are alined. If the alinement were perfect, in both recording and playback heads the timing wave as played back would be in perfect synchronism with the wave from head 3_a_, the waves from the other heads being delayed by successive increments with respect thereto. If the wave shaper 13 is of the simple type comprising an amplifier and a clipper, the sampling pulses would in any case be delayed by 90°, or 1.5 microseconds with respect to the wave from the pickup head; this delay may or may not be compensated by the reactance-tube-discriminator control, depending on the circuit used. Some additional delay will usually be introduced by other equipment in the timing circuit.

Taking these unavoidable delays into account, the variable delay network 8 is adjusted so that the total delay of the sampling pulse, as applied to the decoder associated with head *3a* is equal to one-half the interval within which sampling can be accomplished; 2.5 microseconds with the single decoder of Fig. 2, or 5.25 microseconds with the dual sampler, from the peak of the reproduced wave from the head. Note again that this assumes that by using the timing wave head as the norm in head alinement the inaccuracies in head displacement will vary statistically from this norm. If one of the other heads occupies the mean position in the alinement the delay circuit should preferably be so adjusted that the sampling pulse is supplied to the decoder associated with this head at the mid point of the sampling interval.

Usually a sufficiently accurate adjustment can be made by eye. If the sampling is occurring at the wrong epoch with respect to one or more signals a recurrent pattern will appear on the monitor screen. If there is a major phase displacement, as, for example, a 90° or 180° error as between the storage control and sampling waves, either part or all of the reproduced picture will drop out altogether or part or all will be reproduced in negative, depending on the monitor circuits.

Figure 6:
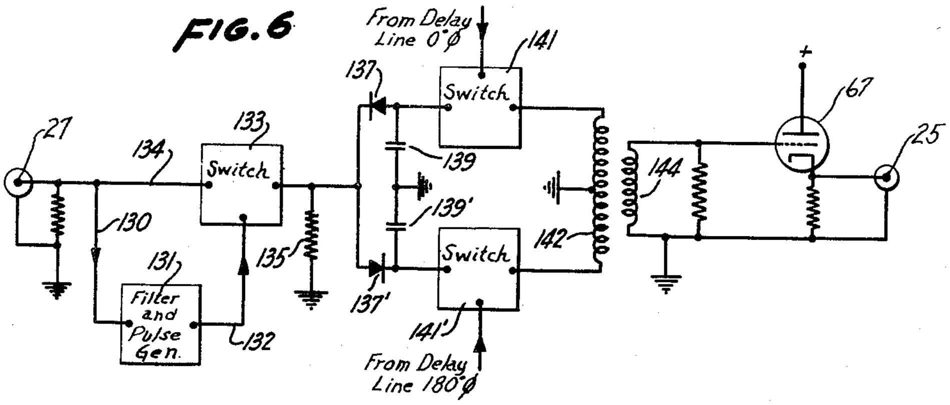
Fig. 6 is a block diagram of a modified type of decoder, shown specifically as applied to the single cycle storage period of the equipment shown in Fig. 1 but readily modifiable to provide longer storage periods.

In Fig. 6 there is shown a modified decoder which may be used to replace in its entirety that shown in Fig. 2 or, with slight modifications such as will be readily apparent to those skilled in the art, to replace that shown in Fig. 4. As will be appreciated from the diagram and as will become more apparent from the detailed description, the decoder of Fig. 6 is entirely different in operation from those above described and the equipment involved is also quite different. Nevertheless, it accomplishes exactly the same function. The similarity to the conventional modulator is not so apparent as in the devices first described, but because the processes involved are essentially those of modulation it has been considered advisable to show first equipment wherein the direct parallel with standard modulation processes was more apparent. However, the adjustment of that next to be described is somewhat easier and the timing is more certain, and therefore it is, for many purposes, to be preferred.

In this particular embodiment the signal from the pickup head, delivered to lead 27, divides into two paths as before. That going to lead 130 is passed through a filter and pulse generator 131, later to be described in detail, which converts the incoming sine wave of timing frequency into unidirectional pulses of double frequency, and feeds them through lead 132 to an electronic switch or gating circuit 133. The pulses from the generator serve merely to close this switch during the instant of the pulse.

The signals directly from the pickup, passing through lead 134, are fed to the switch to be passed on when the latter is closed. The filter and pulse generator include phasing means so that the switches close and the reproduced wave is sampled at the peaks of the modulated waves. The switch therefore passes modulated pulses which are positive or negative in sign, depending upon whether it is a positive or negative peak being sampled. The output circuit of switch 133 includes an impedance matching resistor 135 connecting to ground. Beyond the switch the circuit divides, through oppositely poled rectifiers 137 and 137' to charge storage condensers 139 and 139'. Owing to the opposite directional conduction of the two rectifiers mentioned condenser 139 receives only the positive pulses, whereas 139' receives and stores only the negative pulses. The respective charges are held by the condensers until electronic switches 141 and 141' are closed by pulses from the delay line 19.

As previously indicated the switches are operated only by positive pulses, and equipment is provided, similar to that already described, so that the two switches 141 and 141' receive their pulses respectively at zero and 180° phase angle with respect to the 165 kc. timing wave.

The condensers are discharged, by the closing of the switches, in opposite directions through the primary coil 142 of a transformer, providing unidirectional pulses in the output coil 144 as has been described in connection with the circuit of Fig. 2.

In this brief description the filter and pulse generator, and the electronic switches, have been described only in general terms since they make take various forms. In the forms in which these devices have been embodied they are shown, respectively, in Figs. 7 and 8.

Figure 7:
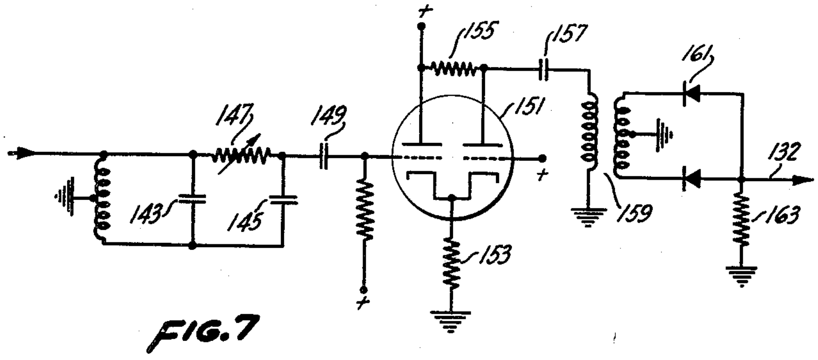
Fig. 7 is a circuit diagram of one form of pulse generator and filter as indicated by one of the blocks of Fig. 6.

Taking first Fig. 7, the modulated 165 kc. waves are supplied first to a high Q tuned circuit 143, across which there is bridged a phase splitter comprising a condenser 145 and a variable resistor 147. This is a high impedance circuit, and the resistor and condenser are so chosen that the impedances offered thereby are of generally comparable magnitude at the 165 kc. frequency. The phase at the junction of the two elements can be regulated by varying the resistor. The junction mentioned is coupled through a condenser 149 to one grid of a double triode 151. The control grid of the other section of this triode is grounded through a positive biasing source; the two cathodes are directly connected and grounded through a cathode resistor 153. The plates of the two sections are connected together through a resistor 155.

The cathode of the second section varies in potential with respect to ground and to the grid because of this connection and the result is that the output of the second section of the tube, due to its limiting action, is a wave of very nearly rectangular shape. This wave is fed through a blocking condenser 157 to the primary of a differentiating transformer 159. The secondary of this transformer is center tapped. Each end of the secondary coil connects to a rectifier 161, the output sides of these rectifiers being connected together and both being so poled that they pass only the positive pulses. These pulses appear across an output resistor 163 which connects to ground. It will be seen that with this arrangement each half of the input wave results in a short, positive pulse which is delivered to the output circuit 132 and thence is fed to the switch 133 as described in connection with the block diagram.

Figure 8:
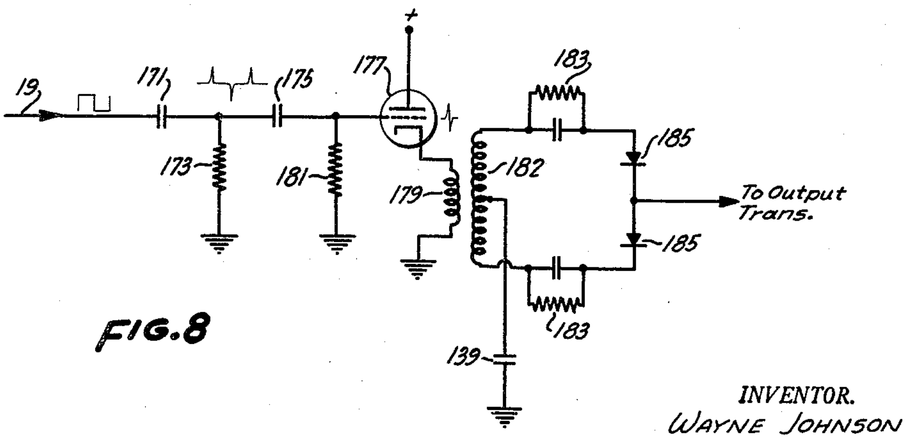
Fig. 8 is a schematic diagram of electronic switches as used in the decoder of Fig. 6.

One form of switch which may be used in the positions indicated by the blocks 141, and 141' of Fig. 6 is shown in Fig. 8. Where switches of this type are used, two delay lines are provided, carrying signals in opposite phase, the added expense of the extra delay line being more than compensated by the use of less equipment in the various decoders.

In this form of the apparatus the square waves from the delay line 19 are fed to a differentiating circuit comprising a condenser 171, of about twenty micromicrofarads, connecting to ground through a resistor 173 of about 600 ohms. The junction of elements 171 and 173 connects through a coupling condenser 175, of about fifty micromicrofarads, to the grid of the cathode follower tube 177, the cathode of which is connected to ground through the primary 179 of a differentiating transformer. The grid tube 177 is biased by means of a grid resistor 181. The resistance of the latter is of the order of five megohms. The time constant of resistor 181 and condenser 175 is over 200 microseconds, as contrasted with about 0.012 microsecond for the differentiating circuit and the six microsecond repetition period of the timing wave.

A center tapped secondary coil 182, which has a one-to-one ratio with respect to coil 179, is coupled to the latter. Two ends of secondary coil 182 each connect through resistor-capacitor biasing circuits 183 to a pair of rectifiers 185, which are connected in series to form a loop conductive in one direction only. A condenser to be discharged by the switch, e. g., condenser 139, connects to the center tap of coil 182 and the output circuit, for connection to coil 142, is connected between the two rectifiers.

With this switch very short pulses can be generated very economically. The differentiating circuit 171—173 has itself a very short time constant, and the rise time of the pulse delivered by it is limited almost solely by the slope of the rise of the square wave pulses fed to it. Supplied to tube 177, the positive halves of these pulses carry the grid strongly positive, causing it to draw current and to accumulate a negative charge on condenser 175, which leaks off so slowly as to retain the tube below cutoff except during the pulse itself. The negative pulses, supplied to the grid of tube 177 during the drop in potential of the square wave, have, of course, no effect, since the tube is already cut off. The unidirectional pulses in the cathode circuit of tube 177 are further differentiated in the transformer 179—181, giving still sharper pulses in the latter. The biasing circuits 183 are adjusted so that the rectifiers 185 conduct only during the peaks of the pulses applied thereto, and since they are connected in the same direction around the pulse circuit it is again only the most "positive" half of each pulse that has any effect. Because of the high frequencies involved, the coils 179 and 181 may be made with extremely low inductance. Very few turns of wire are necessary and the transformer is very economical to build. As actually constructed, the plate current drawn by the cathode follower tube 177 is only about three milliamperes and the pulse time is less than 0.1 microsecond. This leads to an economical power supply in spite of the large number of tubes that are involved in the reproducing equipment as a whole.

Substantially the same switch can be, and preferably is, used in the position indicated by block 133 of Fig. 6. In this case, of course, the differentiating circuit 171—173 is omitted, tube 177 being actuated by the positive pulses supplied from the pulse generator and filter 131 at three microsecond intervals. Otherwise, except for the fact that condenser 139 is replaced by the lead 134 as the source of the input energy to be switched, and that the output circuit leads to rectifiers 137 and 137′ of Fig. 6 the devices are identical.

Using the equipment shown in these last figures has the advantage of shortening the charging period of the memory condensers and thereby extending the available storage period by about nine-tenths of a microsecond, giving a gain of about 16 per cent in the latitude available for sampling. The instant of charge is more accurately controllable than is possible where the relatively broad crest of a sine wave is used to determine the instant of charge and very small changes in bias on the rectifiers which exercise control may make a material difference in the charging intervals. The advantage gained, as with the system as a whole, is a possible relaxation of tolerances and therefore more economical manufacture, as well as the simplicity and lower cost of the equipment itself. The shorter time allotted to the charge of the condensers requires that somewhat higher voltages be provided to store a given amount of energy, but this is only a question of the amount of amplification supplied and the advantages of the arrangement are therefore cheaply gained.

The specific circuits shown for the individual elements of the apparatus described herein are merely illustrative. Many types of balanced modulators have been devised, for example, some using vacuum tubes, others using contact rectifiers of many different varieties. Practically any one of these modulators can be substituted for those shown in connection with this specification. The number of pickup heads, the frequencies employed, and other specific details are those now believed to have advantages in connection with present standards of television transmission but they are not fundamental to the invention as such. Such matters of detail, as described herein, are not intended to limit the scope of the invention, which it is desired to cover as broadly as defined in the following claims.

I claim:

1. In combination with apparatus for reproducing television or like signals recorded as a plurality of phase-displaced tracks, each track representative of the intensity of the signal to be reproduced sampled at successive uniformly spaced instants and the samplings represented on each track being intermediate those represented on each of the others so that the tracks jointly represent a continuous succession of equally spaced samples; an individual translating head adapted to engage each track for converting the recording thereon into a modulated electrical wave of substantially constant frequency; apparatus, associated with each head, comprising a plurality of storage condensers, means controlled in frequency and phase by the wave developed by said head for charging said condensers in repeating order to potentials proportional to successive crests of said modulated constant frequency wave, and means actuable by successive pulses for discharging said condensers in the same order in which charged; means for developing a separate timing wave of said constant frequency, means for deriving from said timing wave a plurality of phase-displaced pulse trains corresponding respectively to the relative sampling intervals as recorded on the several tracks, connections from said last mentioned means to said discharging means, a common output circuit and means for supplying thereto successive pulses resulting from the discharge of all of said condensers.

2. Apparatus in accordance with claim 1 wherein said means for deriving phase-displaced pulse trains includes means for deriving from said timing wave a plurality of secondary timing waves each of a frequency equal to said constant frequency divided by an integer and mutually displaced in phase by 360° divided by said integer, means for deriving phase-displaced pulse trains from each of said secondary waves, said connections to each said discharge means including connections for pulse trains corresponding to each of said secondary waves and each of said pluralities of condensers being at least equal in number to said secondary waves.

3. Apparatus in accordance with claim 2 wherein each of said plurality of condensers is equal in number to twice the number of said secondary waves.

4. Apparatus in accordance with claim 1 wherein said means for developing said timing wave comprises a translating head adapted to engage said record.

5. In combination with apparatus for reproducing television or like signals recorded as a plurality of phase-displaced tracks, each track representative of the intensity of the signal to be reproduced sampled at successive uniformly spaced instants and the samplings represented on each track being intermediate those represented on each of the others so that the tracks jointly represent a continuous succession of equally spaced samples; an individual translating head adapted to engage each track for converting the recording thereon into a modulated electrical wave of substantially constant frequency; apparatus associated with each of said heads comprising means for deriving from the waves produced thereby a control wave of substantially constant amplitude of a frequency equal to said constant frequency divided by an integer, a plurality equal in number to twice said integer of switching means actuated by said control wave and supplied by said head for charging said condensers in rotation to potentials proportional in magnitude to successive crests of said modulated wave; means for generating a timing wave of said constant frequency, means for deriving from said timing wave a plurality of phase-displaced pulse trains, the relative phases of said trains corresponding to the relative phases of samplings as recorded on the respective tracks, a separate switching means associated with each of said pluralities of storage condensers adapted to discharge said condensers in the same rotation in which charged under the control of successive pulses supplied thereto, connections for supplying each of said separate switching means with a corresponding one of said pulse trains, and a common circuit connected to receive from said separate switching means collectively pulses resulting from the discharge of said storage condensers.

6. The combination defined in claim 5 wherein said first-mentioned switching means comprises a plurality of rectifiers, means for biasing said rectifiers in their non-conducting direction to a substantially constant potential, means for applying said control wave to said rectifiers at a peak potential exceeding said constant potential by a small fraction thereof, connections for supplying said modulated wave to said rectifiers and connections from said rectifiers to said condensers.

7. The combination defined in claim 5 wherein said first mentioned switching means comprises a balanced modulating circuit, and wherein said condensers comprise the output portion of said circuit.

8. The combination defined in claim 5 wherein said control-frequency deriving means comprises a resonant circuit connected for supply by said head and a frequency divider connected to said resonant circuit.

9. The combination defined in claim 5 wherein said constant-frequency deriving means comprises a resonant circuit supplied by said head, an amplitude limiter connected to said resonant circuit, and a frequency divider connected to said resonant circuit through said limiter.

10. A decoder for signals of the class described comprising in combination with a pickup head for said signals a signal input circuit for connection to said head, means connected to said signal input circuit for deriving from substantially constant frequency, variable amplitude signals supplied thereto a control wave of substantially constant amplitude, a first balanced modulator circuit including a pair of storage condensers as the output circuit thereof and input connections from said signal input circuit and said control wave deriving means respectively; and a second balanced modulator connected in cascade to said first balanced modulator and including said storage condensers as one input circuit thereof, a second input circuit for connection to a source of sharp pulses recurring at said control frequency and a modulated-pulse output circuit.

11. A decoder in accordance with claim 10 including in said control wave deriving means, frequency dividing means for developing said control wave at an integral sub-multiple of said constant frequency, and a phase splitter connected for supply by said frequency dividing means to develop therefrom polyphase currents of said sub-multiple frequency; a plurality of first balanced modulators each having one input circuit connected for supply by a different phase of said control wave and all having their other input circuits connected to said signal input circuit, second balanced modulators connected respectively in cascade with said first balanced modulators, and means connected to an input circuit of each of said second balanced modulators for supplying thereto sharp pulses at the frequency of said control wave and in the same polyphase relation with respect to the several cascaded modulators as said control waves, the modulated-pulse output circuits of all of said second modulators being connected.

12. A decoder in accordance with claim 10 including, in each of said first balanced modulators, biasing means for limiting conduction from said signal input circuit to said condensers to the intervals wherein said control wave is at substantially peak potential.

13. The method of reproducing television or like signals recorded as a plurality of phonographic tracks, each track being reproducible as a wave of substantially constant frequency modulated by samples of the signal to be reproduced taken at a different phase of a timing wave of like frequency, the relative phases of the recordings as reproduced being uncertain with respect to their relative phases as recorded, which comprises the steps of simultaneously playing back all of said tracks to reproduce said modulated wave trains in their uncertain phase relationship, accumulating from each of said wave trains separate electrical charges proportional in magnitude to successive half-cycles of the reproduced wave modulated by the sampling of the signal to be reproduced, developing a series of pulses corresponding in repetition rate to the frequency of said timing wave, and applying said pulses to release said charges successively into a common circuit in the order and relative phase relation in which the original samples were taken substantially to reconstitute the original signal.

14. The method as defined in claim 13 which includes the steps of dividing each of said wave trains into a plurality of paths, filtering the modulation components from the waves in one of said paths to provide a modulated and an unmodulated wave of constant relative phase, intermodulating the modulated and unmodulated waves to produce pulses corresponding in phase to the peaks of the unmodulated waves and in magnitude to individual half cycles of the modulated waves, and separately accumulating the pulses corresponding to positive and negative peaks to form said separate charges.

15. The method as defined in claim 13 which includes in the steps of developing said pulses and applying said pulses to release the accumulated charges, the subsidiary steps of developing a timing wave of said constant frequency, deriving from said timing wave a plurality of trains of sharp pulses, the pulses in the several trains occurring at relative phases corresponding to the relative phases of sampling the signal to be reproduced as recorded on the various tracks, and modulating said pulses with the charges accumulated from a corresponding track to release said charges in the desired order.

References Cited in the file of this patent

UNITED STATES PATENTS

| Number | Name | Date |
|---|---|---|
| 2,347,084 | Cooney | Apr. 18, 1944 |
| 2,517,808 | Sziklai | Aug. 8, 1950 |